United States Patent
Pedersen et al.

(10) Patent No.: US 11,430,069 B1
(45) Date of Patent: Aug. 30, 2022

(54) DAMAGE PREDICTION SYSTEM USING ARTIFICIAL INTELLIGENCE

(71) Applicant: CoreLogic Solutions, LLC, Irvine, CA (US)

(72) Inventors: David V. Pedersen, Fishers, IN (US); Neil Pearson, Ottawa (CA)

( * ) Notice: Subject to any disclaimer, the term of this patent is extended or adjusted under 35 U.S.C. 154(b) by 82 days.

(21) Appl. No.: 16/247,394

(22) Filed: Jan. 14, 2019

Related U.S. Application Data

(60) Provisional application No. 62/617,530, filed on Jan. 15, 2018.

(51) Int. Cl.
| | |
|---|---|
| *G06Q 40/08* | (2012.01) |
| *G06N 20/00* | (2019.01) |
| *H04N 7/18* | (2006.01) |
| *G06K 9/62* | (2022.01) |
| *G06V 20/10* | (2022.01) |

(52) U.S. Cl.
CPC .......... *G06Q 40/08* (2013.01); *G06K 9/6255* (2013.01); *G06N 20/00* (2019.01); *G06V 20/176* (2022.01); *H04N 7/185* (2013.01)

(58) Field of Classification Search
CPC .. G06Q 40/08; G06K 9/00637; G06K 9/6255; G06N 20/00; H04N 7/185; G06V 20/176
See application file for complete search history.

(56) References Cited

U.S. PATENT DOCUMENTS 9,714,089 B1 * 7/2017 Louw .................... B64C 39/024
9,805,261 B1 * 10/2017 Loveland ............... G06V 20/20
10,102,589 B1 * 10/2018 Tofte ..................... B64C 39/024
10,134,092 B1 * 11/2018 Harvey ................ G06K 9/6201
10,163,164 B1 * 12/2018 Tofte ................... G06K 9/00718

(Continued)

OTHER PUBLICATIONS

Gong, Lixia;Wang, Chao;Wu, Fan;Zhang, Jingfa;Zhang, Hong;Li, Qiang "Earthquake-Induced Building Damage Detection with Post-Event Sub-Meter VHR TerraSAR-X Staring Spotlight Imagery". Publication info: Remote Sensing 8.11: 887. MDPI AG. (2016) (Year: 2016).*

(Continued)

*Primary Examiner* — Elda G Milef
(74) *Attorney, Agent, or Firm* — Knobbe Martens Olson & Bear LLP

(57) ABSTRACT

A damage prediction system that uses hazard data and/or aerial images to predict future damage and/or estimate existing damage to a structure is described herein. For example, the damage prediction system may use forecasted hazard data to predict future damage or use actual hazard data to estimate existing damage. The damage prediction system may obtain hazard data in which structures were or will be impacted by a hazard. The damage prediction system can then generate a flight plan that causes an aerial vehicle to fly over the impacted parcels and capture images. The damage prediction system can use artificial intelligence to process the images for the purpose of identifying potential damage. The damage prediction system can also use a hazard model, the hazard data, and structure characteristics to generate a damage score. The damage prediction system can then use the processed images and/or damage score to generate a virtual claim.

20 Claims, 5 Drawing Sheets

(56) References Cited

U.S. PATENT DOCUMENTS

| | | | | |
|---|---|---|---|---|
| 10,535,103 | B1* | 1/2020 | Tofte | B64D 47/08 |
| 2009/0265193 | A1* | 10/2009 | Collins | G06Q 30/0185 |
| | | | | 901/46 |
| 2013/0226624 | A1* | 8/2013 | Blessman | H04N 7/183 |
| | | | | 705/4 |
| 2015/0073834 | A1* | 3/2015 | Gurenko | G06Q 40/08 |
| | | | | 705/4 |
| 2015/0302529 | A1 | 10/2015 | Jagannathan | |
| 2017/0221152 | A1* | 8/2017 | Nelson | G06Q 40/08 |
| 2017/0270612 | A1* | 9/2017 | Howe | G06Q 30/0278 |
| 2019/0147220 | A1* | 5/2019 | McCormac | G06K 9/6277 |
| | | | | 382/103 |

OTHER PUBLICATIONS

Wagenaar, Dennis, Jurjen de Jong; Laurens M. Bouwer. "Multi-variable Flood Damage Modelling with Limited Data Using Supervised Learning Approaches." Natural Hazards and Earth System Sciences 17.9: 1683-1696. Katlenburg-Lindau: Copernicus GmbH. (2017) (Year: 2017).*

* cited by examiner

DAMAGE PREDICTION SYSTEM USING ARTIFICIAL INTELLIGENCE

CROSS-REFERENCE TO RELATED APPLICATIONS

This application claims priority under 35 U.S.C. § 119(e) to U.S. Provisional Application No. 62/617,530, entitled "DAMAGE PREDICTION SYSTEM USING ARTIFICIAL INTELLIGENCE" and filed on Jan. 15, 2018, which is hereby incorporated by reference herein in its entirety.

TECHNICAL FIELD

The present disclosure generally relates to predicting damage to structures as a result of natural disasters or other hazards using artificial intelligence.

BACKGROUND

Structures may get damaged due to various factors (e.g., hail events, wind events, floods, storm surge, lightning strikes, tornadoes, hurricanes, other weather phenomena, earthquakes, wildfires, service life of structures, etc.). For example, the United States recently experienced 22,500 severe thunderstorm events that impacted structures (e.g., roofs, siding, windows, doors, etc.) and created total losses that exceeded $15 billion. Other weather events led to losses exceeding $25 billion. Currently, assessing potential loss requires an individual to visit the site of damage and inspect the damaged structure. In situations in which a single hazard or a number of hazards that occur within a short period of time cause damage to a large number of structures, it may take days to weeks for all properties to be inspected.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a system for estimating structural damage using artificial intelligence. The system comprises an aerial vehicle, wherein the aerial vehicle comprises a camera. The system further comprises a computing system comprising one or more computing devices, wherein the computing system is configured to communicate with the aerial vehicle and configured with specific computer-executable instructions to at least: obtain hazard data corresponding to a geographic location that comprises a plurality of parcels; identify a first parcel in the plurality of parcels impacted by a hazard using the hazard data; generate flight path parameters for capturing images of the first parcel; receive images captured by the aerial vehicle using the camera and the flight path parameters; retrieve a machine learning model associated with a type of hazard indicated by the hazard data, wherein the machine learning model is trained using a set of images in which one or more pixels of individual images in the set of images are annotated to indicate actual damage to a physical object such that the machine learning model identifies potential damage in response to an input; generate annotated images by providing the captured images as an input to the machine learning model, wherein individual annotated images include one or more annotated pixels at a location in the respective annotated image where the machine learning model identifies potential damage; retrieve a hazard model associated with the type of hazard indicated by the hazard data; generate a first value that represents a damage estimate for the first parcel by providing the hazard data and characteristics of a physical object located on the first parcel as an input to the hazard model, wherein the first value corresponds to a first damage level category in a plurality of damage level categories; generate at least one damage score for the first parcel based on the first value corresponding to the first damage level category; and generate a virtual claim for the first parcel in response to a determination that the at least one damage score exceeds a threshold value, wherein the virtual claim comprises the at least one damage score and the annotated images.

Another aspect of the disclosure provides a system for estimating structural damage using artificial intelligence. The system comprises an aerial vehicle, wherein the aerial vehicle comprises a camera. The system further comprises a computing system comprising one or more computing devices, wherein the computing system is configured to communicate with the aerial vehicle and configured with specific computer-executable instructions to at least: obtain hazard data corresponding to a geographic location that comprises a plurality of parcels; identify a first parcel in the plurality of parcels impacted by a hazard using the hazard data; generate flight path parameters for capturing images of the first parcel; receive images captured by the aerial vehicle using the camera and the flight path parameters; process the captured images to identify potential damage; retrieve a hazard model associated with the type of hazard indicated by the hazard data; generate a first value that represents a damage estimate for the first parcel by providing the hazard data and characteristics of a physical object located on the first parcel as an input to the hazard model; and generate at least one damage score for the first parcel based on a range of values in which the first value falls.

The system of the preceding paragraph can include any sub-combination of the following features: where the computing system is further configured with specific computer-executable instructions to: retrieve a machine learning model associated with a type of hazard indicated by the hazard data, wherein the machine learning model is trained using a set of images in which one or more pixels of individual images in the set of images are annotated to indicate actual damage to a physical object such that the machine learning model identifies potential damage in response to an input, generate annotated images by providing the captured images as an input to the machine learning model, wherein individual annotated images include one or more annotated pixels at a location in the respective annotated image where the machine learning model identifies potential damage, generate a virtual claim for the first parcel in response to a determination that the at least one damage score exceeds a threshold value, wherein the virtual claim comprises the at least one damage score and the annotated images, and transmit the virtual claim to a claims processing system; where the computing system is further configured with specific computer-executable instructions to: receive, from the claims processing system, a request for additional images corresponding to the first parcel, generate second flight path parameters for capturing second images of the first parcel, transmit the second flight path parameters to a second aerial vehicle, and receive second images captured by the second aerial vehicle; where the computing system is further configured with specific computer-executable instructions to transmit the second images to the claims processing system; where the computing system is further configured with specific computer-executable instructions to: annotate the captured second images using a machine learning model to identify potential damage to form second annotated images, and transmit the second annotated images to the claims processing system; where the aerial vehicle is a manned aerial vehicle, and wherein the second aerial vehicle is an unmanned aerial vehicle; where the computing system is further configured with specific computer-executable instructions to obtain the hazard data in response to one of receiving a notification that a hazard has occurred or receiving a request from the claims processing system; and where the hazard data comprises at least one of hail data, wind data, flood data, storm surge data, lightning strike data, tornado data, hurricane data, earthquake data, or wildfire data.

Another aspect of the disclosure provides a computer-implemented method of predicting structural damage using artificial intelligence. The computer-implemented method further comprises: as implemented by one or more computing devices configured with specific computer-executable instructions, receiving a notification that a hazard will occur at a geographic location at a time after a current time; obtaining forecasted hazard data corresponding to the geographic location in response to receiving the notification that the hazard will occur, wherein the geographic location comprises a plurality of parcels; identifying a first parcel in the plurality of parcels that will be impacted by the hazard using the forecasted hazard data; retrieving a hazard model associated with a type of the hazard; generating a first value that represents a damage estimate for the first parcel by providing the forecasted hazard data and characteristics of a physical object located on the first parcel as an input to the hazard model; and generating at least one damage score for the first parcel based on a range of values in which the first value falls.

The computer-implemented method of the preceding paragraph can include any sub-combination of the following features: where the computer-implemented method further comprises: generating a virtual claim for the first parcel in response to a determination that the at least one damage score exceeds a threshold value, and transmitting the virtual claim to a claims processing system; where the computer-implemented method further comprises: receiving, from the claims processing system after the hazard occurs, a request for images corresponding to the first parcel, generating flight path parameters for capturing images of the first parcel, and receiving images captured by the aerial vehicle using the flight path parameters; where the computer-implemented method further comprises transmitting the images to the claims processing system; where the computer-implemented method further comprises: retrieving a machine learning model associated with the type of hazard, wherein the machine learning model is trained using a set of images in which one or more pixels of individual images in the set of images are annotated to indicate actual damage to a physical object such that the machine learning model identifies potential damage in response to an input, generating annotated images by providing the captured images as an input to the machine learning model, wherein individual annotated images include one or more annotated pixels at a location in the respective annotated image where the machine learning model identifies potential damage, and transmitting the annotated images to the claims processing system; where the aerial vehicle is an unmanned aerial vehicle; and where the forecasted hazard data comprises at least one of hail data, wind data, flood data, storm surge data, lightning strike data, tornado data, hurricane data, earthquake data, or wildfire data.

Another aspect of the disclosure provides non-transitory, computer-readable storage media comprising computer-executable instructions for predicting structural damage using artificial intelligence, wherein the computer-executable instructions, when executed by a computer system, cause the computer system to: receive a notification that a hazard will occur or has occurred at a geographic location; obtain hazard data corresponding to the geographic location in response to receiving the notification that the hazard will occur or has occurred, wherein the geographic location comprises a plurality of parcels; identify a first parcel in the plurality of parcels impacted by the hazard using the hazard data; retrieve a hazard model associated with a type of the hazard; generate a first value that represents a damage estimate for the first parcel by providing the hazard data and characteristics of a physical object located on the first parcel as an input to the hazard model; and generate at least one damage score for the first parcel based on a range of values in which the first value falls.

The non-transitory, computer-readable storage media of the preceding paragraph can include any sub-combination of the following features: where the computer-executable instructions further cause the computer system to: generate a virtual claim for the first parcel in response to a determination that the at least one damage score exceeds a threshold value, and transmit the virtual claim to a claims processing system; where the hazard has occurred, and wherein the computer-executable instructions further cause the computer system to: generate flight path parameters for capturing images of the first parcel, and receive images captured by the aerial vehicle using the flight path parameters; where the computer-executable instructions further cause the computer system to: retrieve a machine learning model associated with the type of hazard, wherein the machine learning model is trained using a set of images in which one or more pixels of individual images in the set of images are annotated to indicate actual damage to a physical object such that the machine learning model identifies potential damage in response to an input, and generate annotated images by providing the captured images using as an input to the machine learning model, wherein individual annotated images include one or more annotated pixels at a location in the respective annotated image where the machine learning model identifies potential damage; and where the hazard data comprises at least one of hail data, wind data, flood data, storm surge data, lightning strike data, tornado data, hurricane data, earthquake data, or wildfire data.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
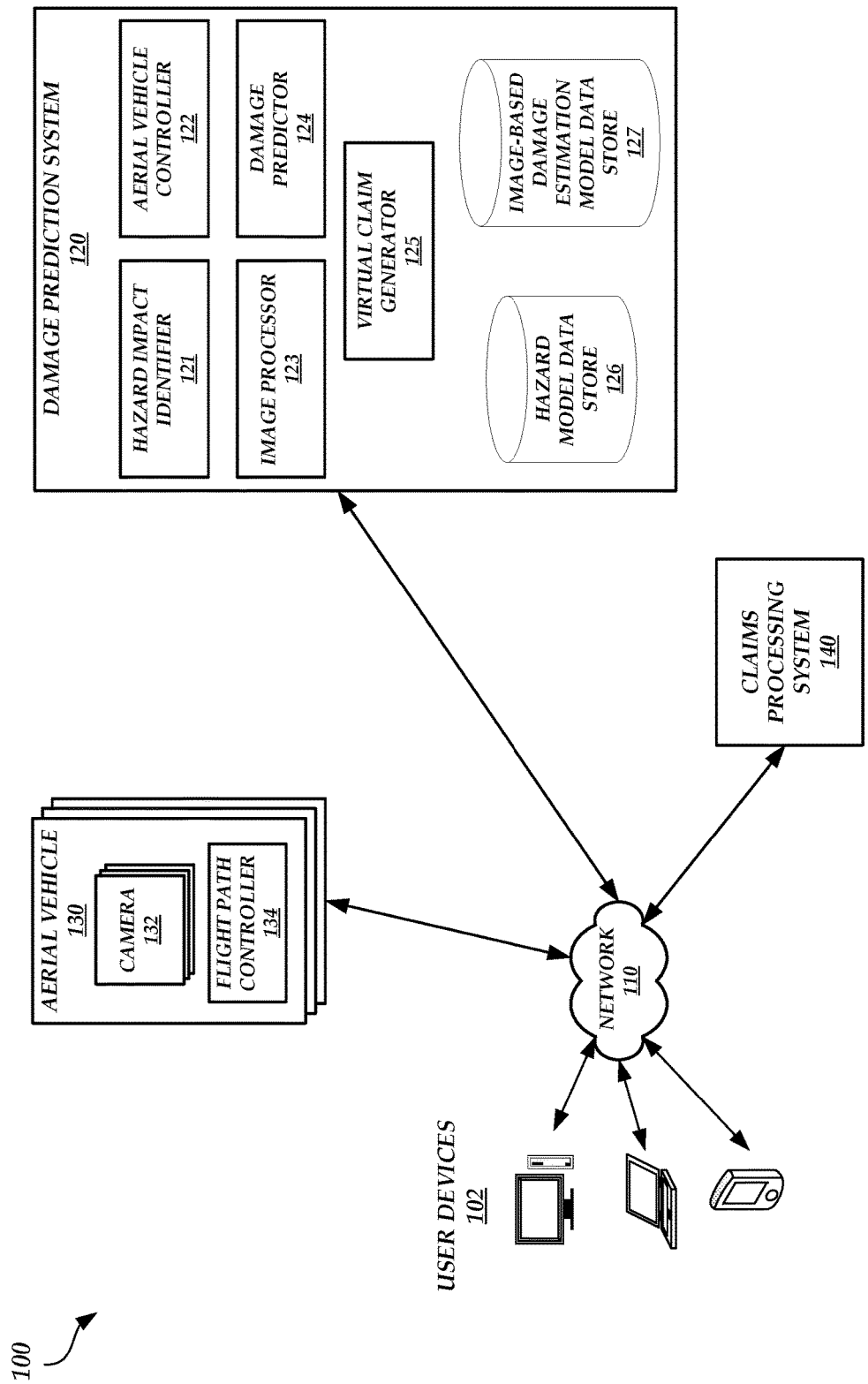
FIG. 1 is a block diagram of an illustrative operating environment in which a damage prediction system uses hazard data, characteristics of a structure, and/or aerial images to predict and/or estimate structural damage.

As described above, structures or other buildings may get damaged due to various factors, such as hazards like hail events, wind events, floods, storm surge, lightning strikes, tornadoes, hurricanes, other weather phenomena, earthquakes, wildfires, and/or the like. The prospect of such damage may motivate building owners to obtain insurance to cover potential damage through property and/or casualty insurance carriers. Building owners may later make an insurance claim in the event that damage does occur to the covered structure or a portion of the structure (e.g., the roof, siding, windows, doors, etc.) otherwise require replacement and/or reconstruction. Accordingly, damage to structures is a consideration for insurance underwriting companies, as the cost to inspect and verify damage can be significant.

Generally, when an insurance claim is filed by a building owner, the property and/or casualty insurance carrier must validate the insurance claim before disbursing funds to cover the loss. Currently, assessing potential loss to validate an insurance claim requires an individual to visit the site of the parcel where damage allegedly occurred and visually inspect the damaged structure. In some cases, an insurance system can use external resources available over a network to determine whether a hazard occurred (e.g., a network-based weather service, a network-based earthquake notification service, etc.). These external resources may be able to provide data indicating the characteristics of the hazard (e.g., hail size, wind speed, wind direction, etc.) at various locations. However, such resources do not provide any data indicating whether a particular location (e.g., a parcel, a structure, etc.) actually experienced damage due to the hazard. Thus, even with conventional insurance systems and external resources, it may still be necessary for an individual to visit the site of potential damage and perform a visual inspection. In situations in which a single hazard or a number of hazards that occur within a short period of time cause damage to a large number of structures, it may take days to weeks for all sites to be inspected.

Accordingly, aspects of the present disclosure provide a damage prediction system that uses hazard data and/or aerial images to predict future damage and/or estimate existing damage to a structure. For example, the damage predicted and/or estimated by the damage prediction system can be used to validate a received insurance claim without first requiring an in-person inspection. In particular, the damage prediction system may use forecasted hazard data to predict future damage or use actual hazard data to estimate existing damage. The damage prediction system may obtain hazard data (e.g., weather data, earthquake data, wildfire data, etc.) and use the hazard data to identify locations (e.g., parcels) in which structures were or will be impacted by conditions that exceeded a certain threshold. As an illustrative example, the damage prediction system may use the hazard data to identify parcels in which structures were or will be impacted by hail larger than three inches in diameter. The damage prediction system can then generate a flight plan (e.g., a set of flight path parameters) that, when followed by an aerial vehicle, causes the aerial vehicle to fly over the impacted parcels. The aerial vehicle may include one or more cameras such that the aerial vehicle can capture images of the impacted parcels and transmit such images to the damage prediction system. Using artificial intelligence (e.g., machine learning techniques), the damage prediction system can train and use a model to process the images for the purpose of identifying potential damage. The damage prediction system can annotate one or more pixels of the images to indicate potential damage.

In addition, the damage prediction system can use one or more hazard models to estimate damage and/or repair costs for structures on the impacted parcels. For example, the damage prediction system can use the hazard data and data corresponding to characteristics of structure(s) located on the impacted parcels (e.g., the type, shape, material, age, position and orientation, and/or condition of the roof, siding, windows, doors, etc.) to predict the type and/or extent of damage experienced by the structure(s) located on the impacted parcels. The prediction may be represented as one or more percentages or absolute values. For example, the prediction may be a set of values including an estimated roof repair cost as a percentage of the total roof replacement cost, an estimated siding (e.g., wall) repair cost as a percentage of the total wall replacement cost, an estimated windows repair cost as a percentage of the total windows replacement cost, an estimated exterior doors repair cost as a percentage of the total exterior doors replacement cost, and/or an estimated building repair cost as a percentage of total building replacement cost. As another example, the prediction may be a set of values including an estimated roof repair cost, an estimated siding repair cost, an estimated windows repair cost, an estimated exterior doors repair cost, and/or an estimated building repair cost. The prediction may further include a variance of the estimated values (e.g., a lower and/or upper bound of possible percentages and/or costs). Optionally, for each portion of a structure located on an impacted parcel, the damage prediction system can generate a damage score using the prediction. As an illustrative example, the roof damage score may be one of five values: 1 (e.g., the roof is in very good condition), 2 (e.g., the roof is in good condition), 3 (e.g., the roof is in fair condition), 4 (e.g., the roof is in poor condition), or 5 (e.g., the roof is in very poor condition). Each roof damage score may map to a range of percentages or absolute values. While the illustrative example is provided herein, this is not meant to be limiting. Other damage score schemes may include greater or fewer damage score values that correspond to the same or different conditions of a physical object (e.g., roof, siding, windows, doors, etc.). Thus, the damage prediction system can generate a roof damage score by identifying to which damage score the roof prediction maps.

The damage prediction system can transmit the annotated images, the damage scores, and/or the predictions to a claims processing system as a virtual claim. The claims processing system can then use the virtual claim to validate any actual claim that is eventually received. In some cases, the claims processing system may transmit to the damage prediction system a request for additional imagery for a specific parcel or set of parcels. In response to receiving such a request, the damage prediction system can generate a flight plan (e.g., a set of flight path parameters) that, when followed by an aerial vehicle, causes the aerial vehicle to capture more detailed images of the identified parcel(s). The damage prediction system may again use artificial intelligence to identify and label potential damage in the additionally captured images. The labeled or annotated images may then be transmitted by the damage prediction system to the claims processing system.

The damage prediction system described herein does not merely automate operations that otherwise are performed by a human. For example, a human may receive notice of an insurance claim, identify on a map a location of the parcel for which the insurance claim is submitted, and travel to the parcel to visually inspect the structure located on the parcel for damage. However, the damage prediction system performs different operations to predict or estimate damage. For example, damage prediction system predicts or estimates the damage to a structure using hazard data and characteristics of the structure without using a visual representation of the structure itself. As described herein, the damage prediction system can use a hazard model that produces a probabilistic output of potential damage, with the hazard data and/or characteristics of the structure provided as inputs to the model.

Furthermore, humans often make subjective determinations of what should be considered damage and what the corresponding costs will be, and thus the visual inspection performed by humans may be inaccurate. On the other hand, the damage prediction system can use the hazard model to provide a more objective, accurate estimation of extent of the damage and possible costs. In fact, the damage prediction system can use the hazard model to predict the damage to a structure before the hazard occurs. A human can only make a subjective estimation, at best, of what damage might occur to a structure before a hazard occurs. Thus, unlike the subjective determinations made by a human, the techniques implemented by the damage prediction system described herein can result in an objective determination of potential damage.

In addition, as described herein, the damage prediction system can further use imagery to supplement the damage estimate. However, unlike humans who process images via electrical signals sent from the optic nerve to the primary visual cortex in the brain, the damage prediction system may use artificial intelligence to process the imagery to identify potential damage. For example, a damage estimation machine learning model trained using a training set of images annotated with actual damage can be used to process current imagery to identify potential damage. Thus, the computing device(s) implementing the damage prediction system may perform operations that are not and cannot be performed by a human by using artificial intelligence to identify potential damage in images. The computing device(s) implementing the damage prediction system thereby uses artificial intelligence to improve the functionality of the computing device(s) itself.

Accordingly, the damage prediction system described herein provides an improvement in computer-related technology (e.g., by allowing computing devices to produce more accurate predictions or estimations of damage to structures that are or will be caused by a hazard) using specific techniques that are not used and cannot practically be used by humans, who instead rely on subjective determinations in estimating structural damage.

In addition to the reasons discussed herein, the damage prediction system described herein also improves the functionality of the computing device(s) that implements some or all of the functionality of the damage prediction system described herein via artificial intelligence. For example, the damage prediction system can use machine learning to process received images. Machine learning is a subset of artificial intelligence that iteratively learns from data without being explicitly programmed. Thus, a computing device configured to use a machine learning process to perform an action can learn how to perform the action without being explicitly programmed. Accordingly, the machine learning process improves the functionality of the computing device itself because the machine learning process allows the computing device to learn, and thereby produce more accurate annotation of images, without being explicitly programmed.

In general, a human does not use a machine learning process to perform any actions given that machine learning is a subset of artificial intelligence and humans use human or natural intelligence to perform actions, not artificial intelligence. It would be impractical for a human (or even a group of humans) to, for example, annotate one or more pixels of one or more images using a machine learning process without the use of a computer. For example, due to the fact that machine learning involves the iterative learning from data, a computing device that uses a machine learning process to perform an action is not programmed by a human with explicit instructions that cause the action to be performed. Rather, a computing device that uses a machine learning process to perform an action makes decisions or predictions in the course of performing the action based on a model learned or trained using sample data. Thus, there is not a known set of instructions that a human could simply follow to mimic the actions performed using a machine learning process.

While the primary use case for the damage prediction system described herein is insurance carriers, this is not meant to be limiting. For example, the damage prediction system can generate predictions, estimates, and/or notifications for property management companies, government agencies that provide housing services (e.g., Federal Emergency Management Agency (FEMA)), retail stores, franchises (e.g., rental car companies, fast food companies, etc.), homeowners, and/or the like.

In addition, while the damage prediction system is described herein as processing high-resolution images captured by an aerial vehicle to predict future damage and/or estimate existing damage to a structure, this is not meant to be limiting. For example, the damage prediction system can process any type of sensor data to predict future damage and/or estimate existing damage to a structure. Such sensor data can include infrared imagery captured by the aerial vehicle, light detection and ranging (LIDAR) imagery captured by the aerial vehicle, satellite imagery, low-orbit imagery (e.g., imagery captured from an elevation lower than imagery captured by a satellite), hail sensor data, wind speed data, and/or the like. The sensor data can be processed by the damage prediction system in the same manner as the high-resolution imagery to predict future damage and/or estimate existing damage to a structure. In addition, the sensor data processed by the damage prediction system may not necessarily originate solely from an aerial vehicle. For example, the damage prediction system can use images and/or text posted to social networks (that, for example, are geo-tagged or otherwise indicate or suggest a location from which an image was captured), alone or in combination with other sensor data, to predict future damage and/or estimate existing damage to a structure. The damage prediction system can perform a search of social networks for images and/or text corresponding to a desired set of geographic coordinates in order to obtain the relevant images and/or text. The damage prediction system may use natural language processing techniques to process the text to identify geographic areas in which damage may have occurred to ultimately predict future damage and/or estimate existing damage to a structure.

Furthermore, while the damage prediction system is described herein as predicting future damage and/or estimating existing damage to a structure on a parcel, the structure is not limited to a building on the parcel. The structure can include fences, sheds, greenhouses, vehicles, and/or other physical objects located on the parcel. Thus, structure characteristics can also include the type, shape, material, age, position and orientation, and/or condition of the roof, siding, windows, doors, hood, trunk, glass, mirrors, wipers, antennas, paint, etc.

The foregoing aspects and many of the attendant advantages of this disclosure will become more readily appreciated as the same become better understood by reference to the following detailed description, when taken in conjunction with the accompanying drawings.

Example Damage Prediction Environment

FIG. 1 is a block diagram of an illustrative operating environment 100 in which a damage prediction system 120 uses hazard data, characteristics of a structure, and/or aerial images to predict and/or estimate structural damage. The operating environment 100 further includes one or more aerial vehicles 130 that may communicate with the damage prediction system 120 via a network 110 to receive flight path parameters and provide aerial images. In addition, the operating environment 100 includes a claims processing system 140 that may communicate with the damage prediction system 120 via the network 110 to receive virtual claims and/or to request additional aerial images. Furthermore, the operating environment 100 includes various user devices 102 that may communicate with the damage prediction system 120 to receive flight path parameters and/or notifications indicating that potential damage is predicted or estimated.

The aerial vehicle 130 may be a manned or unmanned aerial vehicle. For example, the aerial vehicle 130 may be a plane, helicopter, drone, blimp, balloon, and/or the like. In some embodiments, two or more manned and/or unmanned aerial vehicles may be used concurrently at a given site to perform the functionality described herein with respect to a single aerial vehicle 130. The aerial vehicle 130 may include one or more cameras 132. For example, the camera(s) 132 may be high-resolution camera(s) (e.g., 4K, 8K, etc.). The camera(s) 132 may be mounted to a bottom and/or side surface of the aerial vehicle 130 such that the camera(s) 132 can capture images of the land underneath the aerial vehicle 130. One or more of the cameras 132 may include a network interface to communicate with the damage prediction system 120 via the network 110 (or via a wired or wireless point-to-point link). Alternatively, the cameras 132 may transmit data (e.g., captured images) to a network interface (not shown) or input/output device (not shown) of the aerial vehicle 130 for eventual transmission to the damage prediction system 120.

Optionally, an unmanned aerial vehicle 130 may further include a flight path controller 134. The flight path controller 134 may communicate with the damage prediction system 120 to receive flight path parameters. For example, flight path parameters may include a flight path (e.g., one or more geographic coordinates, waypoints, flight length, flight time, speed, altitude, etc.), a shooting angle (e.g., an angle at which one or more cameras 132 is positioned to capture images), camera resolution, and/or the like. Alternatively, the flight path controller 134 can communicate directly with a user device 102, such as a user device 102 present at a site with the aerial vehicle 130. The user device 102 may then communicate with the damage prediction system 120.

Upon receiving flight path parameters, the flight path controller 134 can control the operation of the aerial vehicle 130 according to the flight path parameters. For example, the flight path controller 134 can transmit instructions to various components of the aerial vehicle 130 to cause the aerial vehicle 130 to take off from a current location, follow a certain flight path, instruct the camera(s) 132 to capture images at the appropriate time and at the appropriate angle, and land once the flight is complete. Commercially available drones and associated code may provide such features. In some embodiments, the damage prediction system 120 can transmit updated flight path parameters to the flight path controller 134 while the aerial vehicle 130 is in flight. When updated flight path parameters are received in flight, the flight path controller 134 can transmit instructions to various components of the aerial vehicle 130 to cause the aerial vehicle 130 to adjust flight according to the updated flight path parameters.

The flight path controller 134 may further include instructions that, when executed, cause the aerial vehicle 130 to deviate from the selected flight path at the instruction of a user and/or automatically. For example, the aerial vehicle 130 can transmit captured images in real-time (e.g., as the images are captured) to the damage prediction system 120. The damage prediction system 120 (e.g., the image processor 123 described below) may provide one or more user devices 102 with access to the captured images as they are received during a flight. For example, the damage prediction system 120 may generate user interface data that is transmitted to a user device 102 and that causes the user device 102 to display a user interface showing the images as the images are captured by the one or more cameras 132. A user viewing the user interface and captured images may notice an object of interest and can use controls provided by the user interface to transmit instructions to the aerial vehicle 130 via the damage prediction system 120 that causes the aerial vehicle 130 to return to the location where the object of interest was noticed.

The damage prediction system 120 can be a computing system configured to predict future damage and/or estimate existing damage to a structure. For example, the damage prediction system 120 can obtain hazard data from external sources, use the hazard data to identify parcels impacted by a hazard, apply the hazard data and characteristics of structure(s) located on impacted parcels to one or more hazard models to determine damage scores for the impacted parcels, generate flight path parameters for capturing images of the impacted parcels, process received images to identify potential damage, and generate virtual claims for some or all of the impacted parcels using the damage scores and process images.

The damage prediction system 120 may be a single computing device, or it may include multiple distinct computing devices, such as computer servers, logically or physically grouped together to collectively operate as a server system. The components of the damage prediction system 120 can each be implemented in application-specific hardware (e.g., a server computing device with one or more ASICs) such that no software is necessary, or as a combination of hardware and software. In addition, the modules and components of the damage prediction system 120 can be combined on one server computing device or separated individually or into groups on several server computing devices. In some embodiments, the damage prediction system 120 may include additional or fewer components than illustrated in FIG. 1.

In some embodiments, the features and services provided by the damage prediction system 120 may be implemented as web services consumable via the communication network 110. In further embodiments, the damage prediction system 120 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The damage prediction system 120 may include various modules, components, data stores, and/or the like to provide the damage estimation and prediction functionality described herein. For example, the damage prediction system 120 may include a hazard impact identifier 121, an aerial vehicle controller 122, an image processor 123, a damage predictor 124, a virtual claim generator 125, a hazard model data store 126, and an image-based damage estimation model data store 127.

The hazard impact identifier 121 may obtain hazard data from an external source via the network 110. For example, the hazard impact identifier 121 may receive hazard data from a network-based weather service, a network-based earthquake notification service, a network-based wildfire notification service, and/or the like. Hazard data may include data corresponding to hazards like hail events, wind events, floods, storm surge, lightning strikes, tornadoes, hurricanes, other weather phenomena, earthquakes, wildfires, and/or other perils or natural disasters. For example, hail data may include, at specific geographic locations, hail size, speed of the storm (e.g., wind speed), and/or direction of the storm (e.g., wind direction). Similarly, wind data may include, at specific geographic locations, wind speed, wind direction, and/or maximum wind gusts. Flood data may include, at specific geographic locations, water height, height of flood walls, rate of precipitation, and/or land elevation. Storm surge data may include, at specific geographic locations, water height, height of flood walls, rate of precipitation, and/or land elevation. Lightning strike data may include the location of lightning strikes, the number of lightning strikes, storm speed, storm direction, and/or rate of precipitation. Tornado data may include the location of tornadoes, the intensity of tornadoes, wind speed, tornado direction, amount of precipitation, and/or rate of precipitation. Hurricane data may include the location of hurricanes, the intensity of hurricanes, wind speed, hurricane direction, atmospheric pressure, amount of precipitation, and/or rate of precipitation. Earthquake data may include a location of the earthquake epicenter, the magnitude of the earthquake, the time length of the earthquake, the depth of the earthquake, the geology of the area surrounding the epicenter, and/or data indicating where shaking was felt and the intensity of such shaking. Wildfire data may include a burn area, outside air temperature, wind direction, intensity of the fire, and/or temperature of the fire.

The hazard impact identifier 121 may obtain actual hazard data in response to receiving a notification from an external source that a hazard has occurred. Alternatively or in addition, the hazard impact identifier 121 may obtain forecasted hazard data in response to receiving a notification from an external source that a hazard will occur in the future. Alternatively or in addition, the hazard impact identifier 121 may continuously obtain actual and/or forecasted hazard data regardless of whether a notification is received. Alternatively or in addition, the hazard impact identifier 121 may obtain actual and/or forecasted hazard data in response to receiving a notification from the claims processing system 140 indicating that a claim was received by the claims processing system 140. The hazard impact identifier 121 may obtain the hazard data for the geographic location and/or region indicated in the notification received from the external source and/or the claims processing system 140.

The hazard impact identifier 121 can retrieve data indicating the location of parcels of interest from a data store internal or external to the damage prediction system 120 (not shown). As an illustrative example, a parcel of interest may be a parcel that is associated with an insurance policy issued by an insurance carrier. Using the parcel data and the hazard data, the hazard impact identifier 121 can identify which parcels have been or will be impacted by a hazard. For example, the hazard impact identifier 121 can use the parcel data to identify the geographic locations of parcels and use the hazard data to determine which of the geographic locations has been or will be impacted by the hazard (e.g., the hazard data indicates that the hazard affected the geographic location). Once the impacted parcels are identified, the hazard impact identifier 121 can forward this information to the aerial vehicle controller 122 and/or the damage predictor 124. The hazard impact identifier 121 may further forward the hazard data to the damage predictor 124.

The aerial vehicle controller 122 may generate flight path parameters based on the geographic locations of the impacted parcels. For example, the aerial vehicle controller 122 may generate flight path parameters such that the aerial vehicle 130 flies in a pattern that allows the aerial vehicle 130 to capture images of some or all of the impacted parcels.

In some embodiments, a manned aerial vehicle 130 uses the flight path parameters to conduct the flight and capture the images. For example, once the aerial vehicle controller 122 determines the flight path parameters, the aerial vehicle controller 122 may transmit the flight path parameters to a user device 102, other system, or the aerial vehicle 130 itself. A pilot may then fly the aerial vehicle 130 according to the flight path parameters. The manned aerial vehicle 130 may conduct a flight over a wide area corresponding to the area in which the hazard affected the parcels below. The camera(s) 132 and/or a network interface (not shown) may transmit captured images to the image processor 123 in real-time (e.g., as the images are captured) and/or after the flight is complete.

In other embodiments, an unmanned aerial vehicle 130 uses the flight path parameters to conduct the flight and capture the images. For example, once the aerial vehicle controller 122 determines the flight path parameters, a user may bring the unmanned aerial vehicle 130 to the site (e.g., based on a notification provided by the damage prediction system 120). The aerial vehicle controller 122 can transmit the flight path parameters to the aerial vehicle 130 over the network 110 and instruct the aerial vehicle 130 (e.g., the flight path controller 134) to begin the flight. The aerial vehicle 130 (e.g., the flight path controller 134) may communicate with a satellite system (e.g., a GPS system) and/or terrestrial system to fly according to the received flight path parameters. As the aerial vehicle 130 travels along the indicated flight path, the aerial vehicle 130 captures images of the land underneath the aerial vehicle 130 at a selected interval and in a manner determined by the shooting angle using the one or more cameras 132. For example, the one or more cameras 132 can capture images directly underneath the aerial vehicle 130 (e.g., the camera(s) 132 may be positioned such that a lens is approximately parallel with the land, facing straight down) and/or at an angle (e.g., the camera(s) 132 may be positioned such that a lens deviates from being parallel with the land by a certain angle). The camera(s) 132 and/or a network interface (not shown) may transmit captured images to the image processor 123 in real-time (e.g., as the images are captured) and/or after the flight is complete.

The image processor 123 can use artificial intelligence to process the received images to identify potential damage. For example, one or more image-based damage estimation machine learning models may be stored in the image-based damage estimation model data store 127. The damage prediction system 120 (e.g., the image processor 123) or another computing device (not shown) may have trained the image-based damage estimation machine learning models using a training set of images in which one or more pixels have been annotated to indicate actual damage. A pixel that has been annotated may be a pixel that has been modified from an original state to another state that represents damage. For example, an attribute of the pixel, such as the color of the pixel, may be modified from an original version of the attribute to another version of the attribute that represents damage. Thus, an annotated image may include one or more pixels that have been modified from an original state to another state that represents damage. Alternatively, the annotation of a pixel (or an image) may be represented by text or another data structure that identifies a pixel in an image and that indicates that this pixel is associated with actual (or predicted) damage. In this case, the original colors or other attributes of the pixel may remain unmodified. Rather, the text or other data structure can be appended to the image and/or stored in a file separate from the image. The text or other data structure may include x-y coordinates that identify a pixel and/or other information that can be used to identify a location of a pixel in an image. Each image-based damage estimation machine learning model may correspond to a different hazard and/or portion of a structure. For example, one image-based damage estimation machine learning model may correspond to a hail event and roofs, another image-based damage estimation machine learning model may correspond to a hail event and siding, another image-based damage estimation machine learning model may correspond to a wind event and roofs, and so on. Thus, each image-based damage estimation machine learning model may be trained by the damage prediction system 120 or other computing device using a different training set of images (e.g., images that are labeled or annotated to show roof damage due to hail for the hail and roof image-based damage estimation machine learning model, images that are labeled or annotated to show siding damage due to hail for the hail and siding image-based damage estimation machine learning model, etc.).

The image processor 123 may receive an indication of the type of hazard that occurred or will occur from the hazard impact identifier 121. The image processor 123 can then use the indicated hazard type to retrieve the appropriate image-based damage estimation machine learning model(s) from the image-based damage estimation model data store 127. For example, the image processor 123 may retrieve all image-based damage estimation machine learning models stored in the image-based damage estimation model data store 127 that corresponds to the indicated hazard type. The image processor 123 can provide one or more of the retrieved images as inputs to one or more of the retrieved image-based damage estimation machine learning models (e.g., apply one or more of the retrieved image-based damage estimation machine learning models to one or more of the retrieved images), which causes the one or more image-based damage estimation machine learning models to produce annotated images. In particular, each image-based damage estimation machine learning model may annotate one or more pixels of an image received as an input where the respective image-based damage estimation machine learning model identifies potential damage to produce the annotated image. The image processor 123 can transmit the annotated images to the virtual claim generator 125.

In further embodiments, the image processor 123 may retrieve images of the impacted parcels taken prior to the hazard taking place (if the hazard has already occurred). The image processor 123 can use the appropriate image-based damage estimation machine learning model(s) and/or other image processing models to identify differences between the images taken prior to the hazard and images taken after the hazard. Such differences may indicate potential damage. The image processor 123 can then label or annotate the images to indicate pixels where differences are detected. The image processor 123 can transmit the annotated images to the virtual claim generator 125.

Before, during, or after the image processor 123 processes the retrieved images to identify potential damage, the damage predictor 124 may predict or estimate the damage to one or more of the impacted parcels. For example, the hazard model data store 126 may store one or more hazard models and/or characteristics of structures located on one or more parcels (e.g., the parcels corresponding to policies issued by an insurance carrier). Alternatively, the hazard models and structure characteristics may be stored in separate data stores. Structure characteristics may include the type, shape, material, age, position and orientation, and/or condition of the roof, siding, windows, doors, etc. A hazard model may be model that produces a probabilistic output of possible damage to a structure given the values of the hazard data and the characteristics of the structure.

The damage predictor 124 may use the hazard data received from the hazard impact identifier 121, a hazard model, and structure characteristics to predict or estimate the damage. In particular, the damage predictor 124 can retrieve a hazard model from the hazard model data store 126 corresponding to the hazard type indicated by the hazard impact identifier 121. The damage predictor 124 may also retrieve structure characteristics for structures located on impacted parcels. The damage predictor 124 can then use the hazard data, the retrieved hazard model, and the retrieved structure characteristics to predict the type and/or extent of damage experienced by the structure(s) located on the impacted parcels. For example, the damage predictor 124 may provide, for each impacted parcel, the hazard data and the structure characteristics of the structure located on the respective impacted parcel as inputs to the hazard model. In turn, the hazard model may output, for each impacted parcel, one or more percentages or absolute values. The percentages may include an estimated roof repair cost as a percentage of the total roof replacement cost, an estimated siding (e.g., wall) repair cost as a percentage of the total wall replacement cost, an estimated windows repair cost as a percentage of the total windows replacement cost, an estimated exterior doors repair cost as a percentage of the total exterior doors replacement cost, and/or an estimated building repair cost as a percentage of total building replacement cost. The absolute values may include an estimated roof repair cost, an estimated siding repair cost, an estimated windows repair cost, an estimated exterior doors repair cost, and/or an estimated building repair cost. The absolute values may be determined if the structure characteristics include the total replacement roof, siding, windows, and/or door replacement cost (e.g., then the damage predictor 124 can multiply the replacement cost by the determined percentage to generate the absolute value). The hazard model may further output a variance for each of the estimated values (e.g., a lower and/or upper bound of possible percentages and/or costs for repairing the roof, siding, windows, and/or doors). The damage predictor 124 may transmit the percentages, absolute values, and/or variances to the virtual claim generator 125.

In addition, the damage predictor 124 may optionally generate, for each impacted parcel, damage scores. For example, a particular damage level category may be associated with a range of percentages or absolute values, and thus the percentages or absolute values determined by the damage predictor 124 may correspond to a particular damage level category. As an illustrative example, there may be five damage level categories for roofs: very good condition, good condition, fair condition, poor condition, or very poor condition. Each of the damage level categories may correspond to a damage score (e.g., very good condition may correspond to a damage score of 1, good condition may correspond to a damage score of 2, fair condition may correspond to a damage score of 3, poor condition may correspond to a damage score of 4, and very poor condition may correspond to a damage score of 5). The damage predictor 124 may generate a different damage score for each portion of a structure located on an impacted parcel (e.g., a roof damage score, a siding damage score, a windows damage score, a doors damage score, etc.). Additional details for the techniques implemented by the damage predictor 124 to generate damage scores and to otherwise evaluate the conditions of portions of a structure and score the conditions accordingly can be found in U.S. patent application Ser. No. 14/688,254, titled "ROOF CONDITION EVALUATION AND RISK SCORING SYSTEM AND METHOD" and filed on Apr. 16, 2015, which is hereby incorporated herein by reference in its entirety. The damage predictor 124 can transmit the damage scores to the virtual claim generator 125.

In further embodiments, the damage predictor 124 processes images and/or text obtained from social networks in combination with the hazard data, the retrieved hazard model, and the retrieved structure characteristics to predict the type and/or extent of damage experienced by the structure(s) located on the impacted parcels. For example, the damage predictor 124 (or the image processor 123) can process images obtained from social networks in a manner as described above with respect to how the image processor 123 processes images to identify geographic locations in which it appears that damage has occurred. Similarly, the damage predictor 124 can process text obtained from social networks using, for example, natural language techniques, to identify geographic locations in which it appears that damage has occurred. If the damage predictor 124 identifies a potential geographic location in which it appears that damage has occurred using social network information, the damage predictor 124 may adjust the hazard model output such that the damage score, percentages, absolute values, and/or variances are higher or otherwise indicate damage is more likely to have occurred.

The virtual claim generator 125 can use the percentages, absolute values, and/or damage scores received from the damage predictor 124 to determine whether to generate a virtual claim for a particular impacted parcel. For example, for each impacted parcel, the virtual claim generator 125 can determine whether one or more of the associated percentages exceed a threshold value, whether one or more of the associated absolute values exceed a threshold value, and/or whether one or more of the damage scores exceed a threshold value. If one or more of the percentages, absolute values, and/or damage scores exceeds a corresponding threshold value, then the virtual claim generator 125 can generate a virtual claim for the corresponding impacted parcel. As an illustrative example, the virtual claim generator 125 may generate a virtual claim for an impacted parcel if the estimated roof repair cost as a percentage of the total roof replacement cost meets or exceeds 20%, if the estimated roof repair cost meets or exceeds $5,000, or if the roof damage score meets or exceeds 4 (e.g., the roof is at least in poor condition). While the illustrative example is provided herein, this is not meant to be limiting. The virtual claim generator 125 may generate a virtual claim for an impacted parcel if any individual or set of conditions are true. For example, the virtual claim generator 125 may generate a virtual claim for an impacted parcel if the estimated roof repair cost as a percentage of the total roof replacement cost meets or exceeds any selected threshold value, if the estimated roof repair cost meets or exceeds any selected monetary amount, or if the roof damage score meets or exceeds any selected value.

A generated virtual claim may include an identification of the parcel and/or policy; the percentages, absolute values, and/or damage scores associated with the parcel and/or policy that are generated by the damage predictor 124; and/or the annotated images associated with the parcel and/or policy that are generated by the image processor 123. The virtual claim generator 125 can transmit the generated virtual claims to the claims processing system 140. Optionally, the virtual claim generator 125 can generate and transmit a notification to a user device 102 when a virtual claim is generated. The notification may indicate the parcel and/or policy for which a notification is generated, the hazard that has occurred or will occur, the reason the notification was generated, and/or the like.

In some cases, the claims processing system 140 may transmit a request to the damage prediction system 120 for additional aerial imagery. For example, if a policy holder (e.g., a building owner) submits an actual claim for a parcel in which a virtual claim is received from the virtual claim generator 125, then the claims processing system 140 may request additional aerial imagery. The request may be transmitted by the claims processing system 140 to the aerial vehicle controller 122, with the request identifying a parcel and/or a set of geographic coordinates. The aerial vehicle controller 122 may generate flight path parameters and transmit such parameters to the aerial vehicle 130 in a manner as described herein. The aerial vehicle 130 that receives the flight path parameters may be the same aerial vehicle or a different aerial vehicle than the one that captured images after the impacted parcels were identified. In some embodiments, because the claims processing system 140 may be requesting aerial imagery for a small number of parcels, an unmanned aerial vehicle 130 may be used to capture the aerial imagery. Once the images have been captured, the aerial vehicle 130 can transmit the images to the image processor 123. Optionally, the image processor 123 may annotate the images using artificial intelligence as described herein. The image processor 123 may transmit the received images and/or the annotated images to the claims processing system 140 to satisfy the request and supplement the virtual claim.

The hazard model data store 126 stores hazard models (e.g., at least one model per hazard type) and/or structural characteristics for one or more parcels. While the hazard model data store 126 is depicted as being located internal to the damage prediction system 120, this is not meant to be limiting. For example, not shown, the hazard model data store 126 can be located external to the damage prediction system 120.

The image-based damage estimation model data store 127 stores image-based damage estimation machine learning models for different hazard types and/or different portions of a structure. While the image-based damage estimation model data store 127 is depicted as being located internal to the damage prediction system 120, this is not meant to be limiting. For example, not shown, the image-based damage estimation model data store 127 can be located external to the damage prediction system 120.

Example Block Diagrams for Estimating Structural Damage after a Hazard Occurs

Figure 2A:
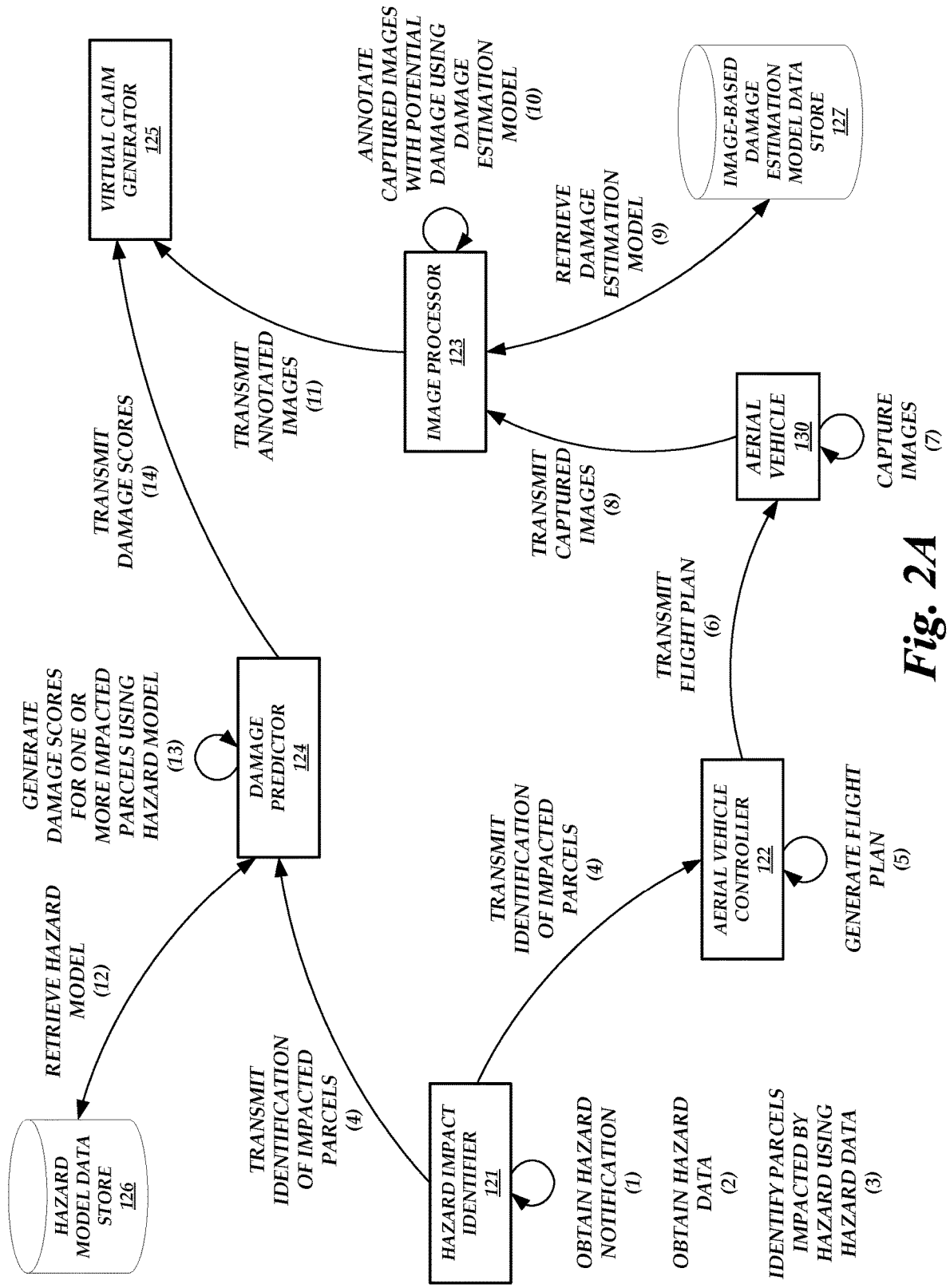
FIGS. 2A-2B are flow diagrams illustrating the operations performed by the components of the operating environment of FIG. 1 to estimate damage to a structure as a result of a hazard and to generate a virtual claim.
Figure 2B:
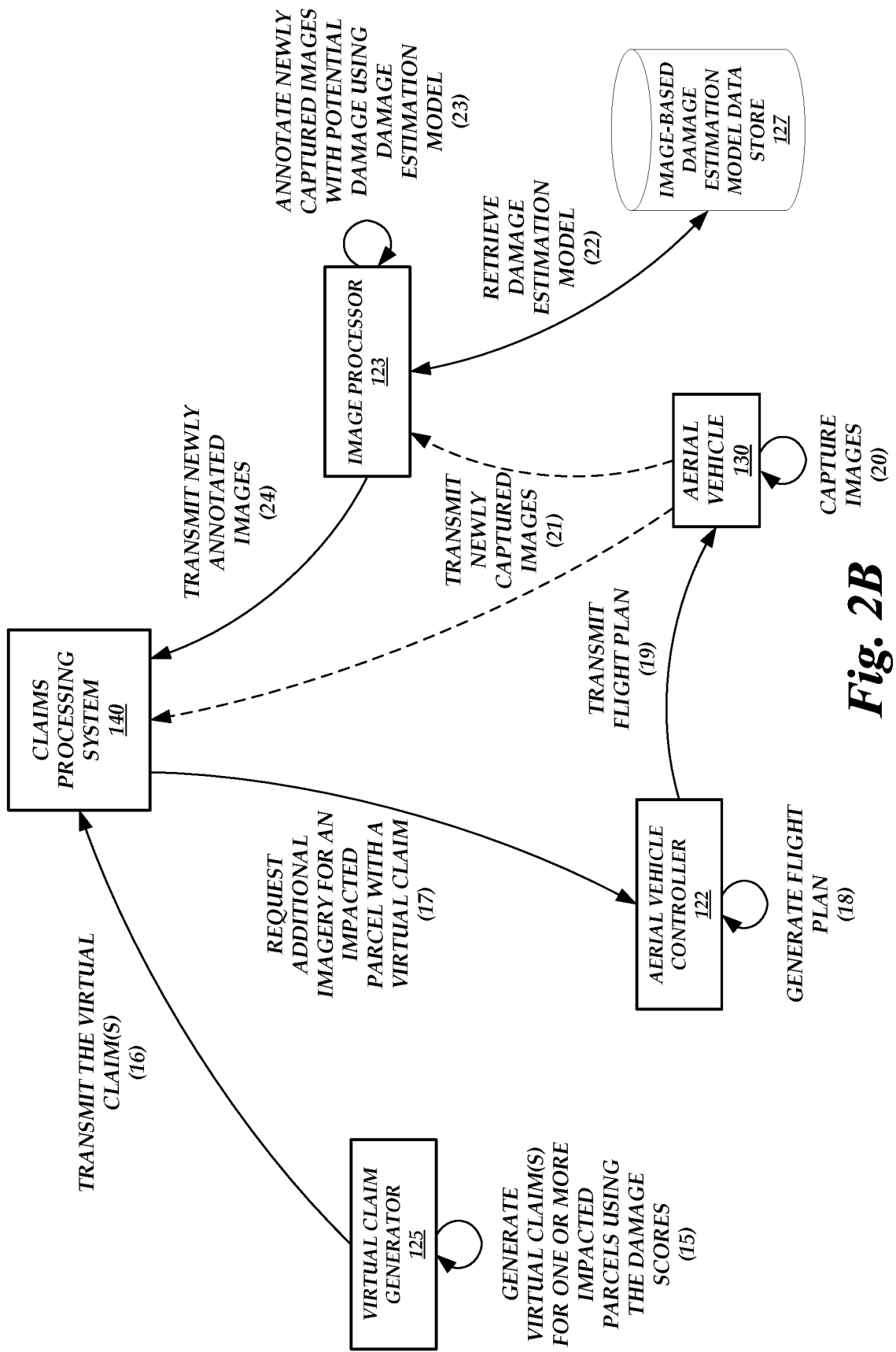

FIGS. 2A-2B are flow diagrams illustrating the operations performed by the components of the operating environment 100 of FIG. 1 to estimate damage to a structure as a result of a hazard and to generate a virtual claim. As illustrated in FIG. 2A, the hazard impact identifier 121 obtains a hazard notification at (1). For example, the hazard notification may be received after a hazard has occurred from an external source and/or the claims processing system 140.

In response to receiving the hazard notification, the hazard impact identifier 121 may obtain hazard data at (2). The hazard impact identifier 121 may then identify parcels impacted by the hazard using the hazard data at (3). For example, the hazard impact identifier 121 can use the hazard data to identify at which geographic locations the hazard occurred and identify parcels corresponding to those geographic locations. The identified parcels may be those parcels corresponding to policies issued by a specific insurance carrier. The hazard impact identifier 121 can then transmit an identification of the impacted parcels to the aerial vehicle controller 122 and/or the damage predictor 124 at (4).

The aerial vehicle controller 122 can generate a flight plan at (5) using the identification of the impacted parcels. For example, the flight plan may include flight path parameters that cause an aerial vehicle 130 to fly along a path that allows the aerial vehicle 130 to capture images of the impacted parcels. The aerial vehicle controller 122 can transmit the flight plan to the aerial vehicle 130 at (6).

The aerial vehicle 130 can capture images at (7) according to the flight plan. The aerial vehicle 130 can then transmit the captured images to the image processor 123 at (8).

The image processor 123 can retrieve a damage estimation model (e.g., an image-based damage estimation machine learning model) from the image-based damage estimation model data store 127 at (9) in order to annotate the captured images. For example, the image processor 123 may retrieve one or more damage estimation models corresponding to the hazard type. The image processor 123 can then annotate captured images with potential damage using the damage estimation model(s) at (10). The image processor 123 then transmits the annotated images to the virtual claim generator 125 at (11).

Before, during, or after the aerial vehicle controller 122, the aerial vehicle 130, and/or the image processor 123 perform the operations described herein, the damage predictor 124 may retrieve a hazard model from the hazard model data store 126 at (12). The hazard model retrieved may be a hazard model corresponding to the hazard type. In addition, the damage predictor 124 may retrieve structural characteristics for structures located on the impacted parcels. The damage predictor 124 can then generate damage scores for one or more impacted parcels using the hazard model at (13). For example, the damage predictor 124 can use the hazard data obtained by the hazard impact identifier 121 and/or the structural characteristics as inputs to the hazard model in order to generate percentages and/or absolute values that can be used to generate the damage scores. The damage predictor 124 then transmits the damage scores to the virtual claim generator 125 at (14).

As illustrated in FIG. 2B, the virtual claim generator 125 generates virtual claim(s) for one or more impacted parcels using the damage scores at (15). The virtual claim generator 125 then transmits the generated virtual claim(s) to the claims processing system 140 at (16). The virtual claim(s) may include an identification of the parcel and/or policy; the damage scores associated with the parcel and/or policy that are generated by the damage predictor 124; and/or the annotated images associated with the parcel and/or policy that are generated by the image processor 123.

At a later time, the claims processing system 140 may transmit to the aerial vehicle controller 122 a request for additional imagery for an impacted parcel with a virtual claim at (17). In response, the aerial vehicle controller 122 generates a flight plan at (18) and transmits the flight plan to the aerial vehicle 130 at (19). The aerial vehicle then captures the images at (20) according to the flight plan.

In some embodiments, the aerial vehicle 130 then transmits the newly captured images to the claims processing system 140 at (21). In other embodiments, the aerial vehicle 130 transmits the newly captured images to the image processor 123 at (21) for further processing. If the image processor 123 receives the newly captured images, then the image processor 123 can retrieve a damage estimation model (e.g., an image-based damage estimation machine learning model) from the image-based damage estimation model data store 127 at (22) in order to annotate the newly captured images. The image processor 123 can then annotate the newly captured images with potential damage using the damage estimation model(s) at (23). The image processor 123 then transmits the newly annotated images to the virtual claim generator 125 at (24).

Figure 3:
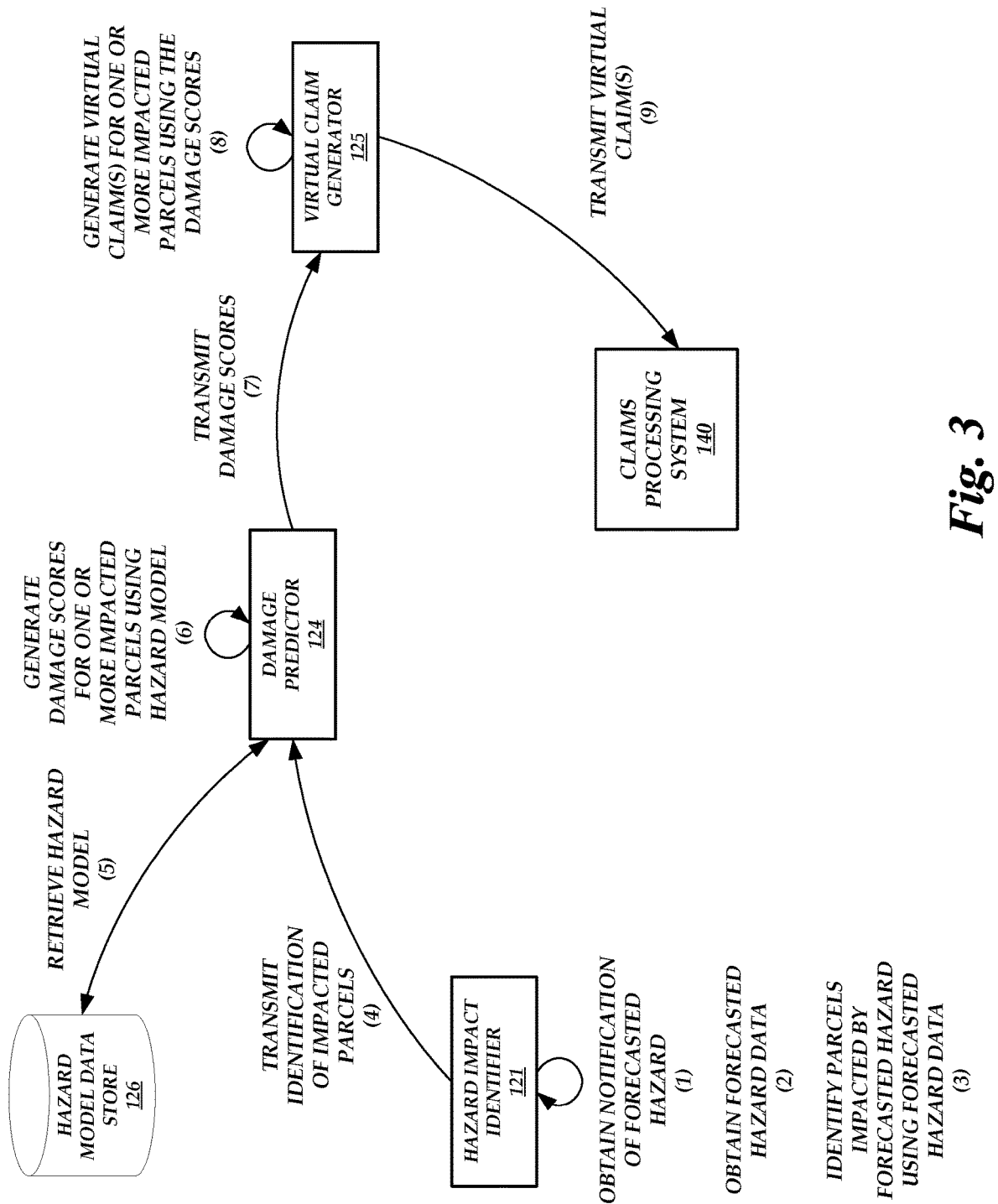
FIG. 3 is a flow diagram illustrating the operations performed by the components of the operating environment of FIG. 1 to predict damage to a structure as a result of a forecasted hazard and to generate a virtual claim.

Example Block Diagram for Predicting Structural Damage Prior to a Hazard Occurring FIG. 3 is a flow diagram illustrating the operations performed by the components of the operating environment 100 of FIG. 1 to predict damage to a structure as a result of a forecasted hazard and to generate a virtual claim. As illustrated in FIG. 3, the hazard impact identifier 121 obtains a notification of a forecasted hazard at (1). For example, the forecasted hazard notification may be received prior to a hazard occurring from an external source.

In response to receiving the forecasted hazard notification, the hazard impact identifier 121 may obtain forecasted hazard data at (2) (e.g., hazard data that is expected to occur at a later time). The hazard impact identifier 121 may then identify parcels impacted by the forecasted hazard using the forecasted hazard data at (3). For example, the hazard impact identifier 121 can use the forecasted hazard data to identify at which geographic locations the hazard may occur and identify parcels corresponding to those geographic locations. The identified parcels may be those parcels corresponding to policies issued by a specific insurance carrier. The hazard impact identifier 121 can then transmit an identification of the impacted parcels to the damage predictor 124 at (4). In some embodiments, the aerial vehicle controller 122 and/or the image processor 123 do not perform any operations, such as the operations described above with respect to FIGS. 2A-2B, because the hazard has not occurred yet and thus there is no need to capture images.

The damage predictor 124 may retrieve a hazard model from the hazard model data store 126 at (5). The hazard model retrieved may be a hazard model corresponding to the hazard type. In addition, the damage predictor 124 may retrieve structural characteristics for structures located on the impacted parcels. The damage predictor 124 can then generate damage scores for one or more impacted parcels using the hazard model at (6). For example, the damage predictor 124 can use the hazard data obtained by the hazard impact identifier 121 and/or the structural characteristics as inputs to the hazard model in order to generate percentages and/or absolute values that can be used to generate the damage scores. The damage predictor 124 then transmits the damage scores to the virtual claim generator 125 at (7).

The virtual claim generator 125 generates virtual claim(s) for one or more impacted parcels using the damage scores at (8). The virtual claim generator 125 then transmits the generated virtual claim(s) to the claims processing system 140 at (9). The virtual claim(s) may each include an identification of the parcel and/or policy; and/or the damage scores associated with the parcel and/or policy that are generated by the damage predictor 124.

Example Virtual Claim Generation Routine

Figure 4:
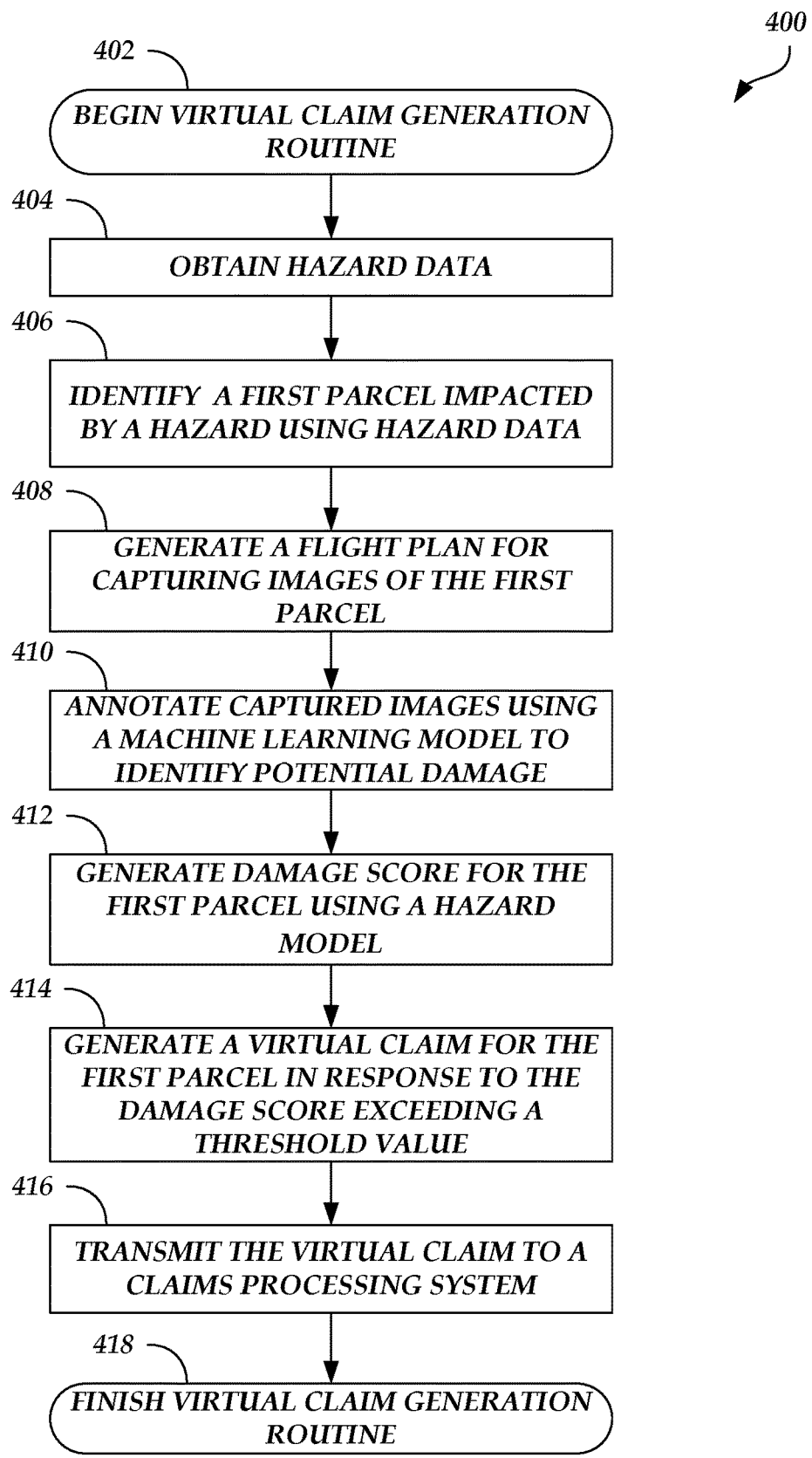
FIG. 4 is a flow diagram depicting a virtual claim generation routine illustratively implemented by a damage prediction system, according to one embodiment.

FIG. 4 is a flow diagram depicting a virtual claim generation routine 400 illustratively implemented by a damage prediction system, according to one embodiment. As an example, the damage prediction system 120 of FIG. 1 can be configured to execute the virtual claim generation routine 400. The virtual claim generation routine 400 begins at block 402.

At block 404, hazard data is obtained. For example, the hazard data may be obtained as a result of a notification that hazard has occurred or will occur.

At block 406, a first parcel impacted by a hazard is identified using the hazard data. For example, the geographic coordinates of the first parcel may be used to make the identification.

At block 408, a flight plan for capturing images of the first parcel are generated. For example, the flight plan may include flight path parameters for capturing images of the first parcel and/or other parcels.

At block 410, captured images are annotated using a machine learning model to identify potential damage. For example, the machine learning model may be an image-based damage estimation machine learning model that corresponds with the type of hazard that has occurred or will occur.

Blocks 408 and/or 410 can be optional. For example, the virtual claim generation routine 400 may proceed from block 406 to block 412 instead of from block 406 to block 408. In addition, blocks 408 and/or 410 may be executed by the virtual claim generation routine 400 before or after block 412.

At block 412, a damage score is generated for the first parcel using a hazard model. For example, the damage score may be generated by the hazard model using hazard data and structural characteristics of the first parcel as inputs.

At block 414, a virtual claim for the first parcel is generated in response to a determination that the damage score exceeds a threshold value. For example, the damage score may indicate that a portion of the structure located on the first parcel, such as the roof, siding, windows, and/or doors are in poor or very poor condition as a result of the hazard.

At block 416, the virtual claim is transmitted to a claims processing system. The claims processing system may use the virtual claim to validate an actual claim that is received. For example, the claims processing system can use the information provided in the virtual claim to verify that a hazard indicated in the actual claim did occur and can compare the loss indicated in the actual claim to the damage score (or percentages, absolute values, or annotated images) included in the virtual claim to verify whether the indicated loss is consistent with the estimated or predicted loss (as indicated by the damage score, percentages, absolute values, and/or annotated images). After the virtual claim is transmitted to the claims processing system, the virtual claim generation routine 400 ends, as shown at block 418.

Additional Embodiments

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser, a stand-alone application, etc.) that allows a user to view captured images, set flight path parameters, modify a flight path during flight, and/or receive notifications that a virtual claim has been generated by the virtual claim generator 125.

Similar to the damage prediction system 120, the claims processing system 140 may be a single computing device, or it may include multiple distinct computing devices, such as computer servers, logically or physically grouped together to collectively operate as a server system. The components of the claims processing system 140 can each be implemented in application-specific hardware (e.g., a server computing device with one or more ASICs) such that no software is necessary, or as a combination of hardware and software. In addition, the modules and components of the claims processing system 140 can be combined on one server computing device or separated individually or into groups on several server computing devices. In some embodiments, the claims processing system 140 may include additional or fewer components than illustrated in FIG. 1.

In some embodiments, the features and services provided by the claims processing system 140 may be implemented as web services consumable via the communication network 110. In further embodiments, the claims processing system 140 is provided by one more virtual machines implemented in a hosted computing environment. The hosted computing environment may include one or more rapidly provisioned and released computing resources, which computing resources may include computing, networking and/or storage devices.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for estimating structural damage using artificial intelligence, the system comprising:
    an aerial vehicle, wherein the aerial vehicle comprises a camera; and
    a computing system comprising one or more computing devices, wherein the computing system is configured to communicate with the aerial vehicle and configured with specific computer-executable instructions to at least:
        obtain hazard data corresponding to a geographic location that comprises a plurality of parcels and that indicates a strength or severity of one or more hazards that impacted the geographic location;
        identify a first parcel in the plurality of parcels impacted by a hazard using the hazard data;
        generate flight path parameters for capturing images of the first parcel;
        receive images captured by the aerial vehicle using the camera and the flight path parameters;
        retrieve a machine learning model associated with a type of hazard indicated by the hazard data, wherein the machine learning model is trained using a set of images in which one or more pixels of individual images in the set of images are annotated to indicate actual damage to a physical object caused by the type of hazard indicated by the hazard data such that the machine learning model identifies potential damage in response to an input;
        generate annotated images by providing the captured images as an input to the machine learning model, wherein individual annotated images include one or more annotated pixels at a location in the respective annotated image where the machine learning model identifies potential damage;
        retrieve a hazard model associated with the type of hazard indicated by the hazard data;
        generate a first value that represents a damage estimate for the first parcel by providing the hazard data and structural characteristics of a physical object located on the first parcel as an input to the hazard model, wherein the first value corresponds to a first damage level category in a plurality of damage level categories;
        generate at least one damage score for the first parcel based on the first value corresponding to the first damage level category; and
        generate a virtual claim for the first parcel in response to a determination that the at least one damage score exceeds a threshold value, wherein the virtual claim comprises the at least one damage score and the annotated images.

2. A system for estimating structural damage using artificial intelligence, the system comprising:
    an aerial vehicle, wherein the aerial vehicle comprises a camera; and
    a computing system comprising one or more computing devices, wherein the computing system is configured to communicate with the aerial vehicle and configured with specific computer-executable instructions to at least:
        obtain hazard data corresponding to a geographic location that comprises a plurality of parcels and that indicates a strength or severity of one or more hazards that impacted the geographic location;
        identify a first parcel in the plurality of parcels impacted by a hazard using the hazard data;
        generate flight path parameters for capturing images of the first parcel;
        receive images captured by the aerial vehicle using the camera and the flight path parameters;
        generate annotated images by providing the captured images as an input to a machine learning model associated with a type of hazard indicated by the hazard data, wherein the machine learning model is trained using a set of images in which one or more pixels of individual images in the set of images are annotated to indicate actual damage to a physical object caused by the type of hazard indicated by the hazard data such that the machine learning model identifies potential damage in response to an input;
        retrieve a hazard model associated with the type of hazard indicated by the hazard data;
        generate a first value that represents a damage estimate for the first parcel by providing the hazard data and structural characteristics of a physical object located on the first parcel as an input to the hazard model; and
        generate at least one damage score for the first parcel based on a range of values in which the first value falls.

3. The system of claim 2, wherein the computing system is further configured with specific computer-executable instructions to:
    retrieve the machine learning model associated with the type of hazard indicated by the hazard data;
    generate annotated images by providing the captured images as an input to the machine learning model, wherein individual annotated images include one or more annotated pixels at a location in the respective annotated image where the machine learning model identifies potential damage;
    generate a virtual claim for the first parcel in response to a determination that the at least one damage score exceeds a threshold value, wherein the virtual claim comprises the at least one damage score and the annotated images; and
    transmit the virtual claim to a claims processing system.

4. The system of claim 2, wherein the computing system is further configured with specific computer-executable instructions to:
    receive, from the claims processing system, a request for additional images corresponding to the first parcel;

generate second flight path parameters for capturing second images of the first parcel;
transmit the second flight path parameters to a second aerial vehicle; and
receive second images captured by the second aerial vehicle.

5. The system of claim 4, wherein the computing system is further configured with specific computer-executable instructions to transmit the second images to the claims processing system.

6. The system of claim 4, wherein the computing system is further configured with specific computer-executable instructions to:
annotate the captured second images using the machine learning model to identify potential damage to form second annotated images; and
transmit the second annotated images to the claims processing system.

7. The system of claim 4, wherein the aerial vehicle is a manned aerial vehicle, and wherein the second aerial vehicle is an unmanned aerial vehicle.

8. The system of claim 2, wherein the computing system is further configured with specific computer-executable instructions to obtain the hazard data in response to one of receiving a notification that a hazard has occurred or receiving a request from the claims processing system.

9. The system of claim 2, wherein the hazard data comprises at least one of hail data, wind data, flood data, storm surge data, lightning strike data, tornado data, hurricane data, earthquake data, or wildfire data.

10. A computer-implemented method of predicting structural damage using artificial intelligence, the computer-implemented method comprising:
receiving, by one or more computing devices configured to communicate with an aerial vehicle, a notification that a hazard will occur at a geographic location at a time after a current time;
obtaining forecasted hazard data corresponding to the geographic location in response to receiving the notification that the hazard will occur, wherein the geographic location comprises a plurality of parcels, and wherein the forecasted hazard data indicates a strength or severity of the hazard that will occur at the geographic location;
identifying a first parcel in the plurality of parcels that will be impacted by the hazard using the forecasted hazard data;
generating a flight path parameter for capturing an image of the first parcel;
receiving the image captured by the aerial vehicle using the flight path parameter;
generating an annotated image by providing the captured image as an input to a machine learning model associated with the type of hazard that is trained using a set of images in which one or more pixels of individual images in the set of images are annotated to indicate actual damage to a physical object caused by the type of hazard indicated by the hazard data;
retrieving a hazard model associated with a type of the hazard;
generating a first value that represents a damage estimate for the first parcel by providing the forecasted hazard data and structural characteristics of a physical object located on the first parcel as an input to the hazard model; and
generating at least one damage score for the first parcel based on a range of values in which the first value falls.

11. The computer-implemented method of claim 10, further comprising:
generating a virtual claim for the first parcel in response to a determination that the at least one damage score exceeds a threshold value; and
transmitting the virtual claim to a claims processing system.

12. The computer-implemented method of claim 10, further comprising
receiving, from the claims processing system after the hazard occurs, a request for images corresponding to the first parcel.

13. The computer-implemented method of claim 12, further comprising transmitting the image to the claims processing system.

14. The computer-implemented method of claim 12, wherein generating an annotated image further comprises:
retrieving the machine learning model associated with the type of hazard, wherein the machine learning model is trained such that the machine learning model identifies potential damage in response to an input;
generating the annotated image by providing the captured image as an input to the machine learning model, wherein the annotated image includes one or more annotated pixels at a location in the annotated image where the machine learning model identifies potential damage; and
transmitting the annotated image to the claims processing system.

15. The computer-implemented method of claim 12, wherein the aerial vehicle is an unmanned aerial vehicle.

16. The computer-implemented method of claim 10, wherein the forecasted hazard data comprises at least one of hail data, wind data, flood data, storm surge data, lightning strike data, tornado data, hurricane data, earthquake data, or wildfire data.

17. Non-transitory, computer-readable storage media comprising computer-executable instructions for predicting structural damage using artificial intelligence, wherein the computer-executable instructions, when executed by a computer system configured to communicate with an aerial vehicle, cause the computer system to:
receive a notification that a hazard will occur or has occurred at a geographic location;
obtain hazard data corresponding to the geographic location in response to receiving the notification that the hazard will occur or has occurred, wherein the geographic location comprises a plurality of parcels, and wherein the hazard data indicates a strength or severity of the hazard that will occur or has occurred at the geographic location;
identify a first parcel in the plurality of parcels impacted by the hazard using the hazard data;
generate a flight path parameter for capturing an image of the first parcel;
receive an image captured by the aerial vehicle using the flight path parameter;
generate an annotated image by providing the captured image as an input to a machine learning model associated with the type of hazard that is trained using a set of images in which one or more pixels of individual images in the set of images are annotated to indicate actual damage to a physical object caused by the type of hazard indicated by the hazard data;
retrieve a hazard model associated with a type of the hazard;

generate a first value that represents a damage estimate for the first parcel by providing the hazard data and structural characteristics of a physical object located on the first parcel as an input to the hazard model; and generate at least one damage score for the first parcel based on a range of values in which the first value falls.

18. The non-transitory, computer-readable storage media of claim 17, wherein the computer-executable instructions further cause the computer system to:

generate a virtual claim for the first parcel in response to a determination that the at least one damage score exceeds a threshold value; and transmit the virtual claim to a claims processing system.

19. The non-transitory, computer-readable storage media of claim 17, wherein the computer-executable instructions further cause the computer system to:

retrieve the machine learning model associated with the type of hazard, wherein the machine learning model is trained such that the machine learning model identifies potential damage in response to an input; and generate the annotated image by providing the captured image using as an input to the machine learning model, wherein the annotated image includes one or more annotated pixels at a location in the annotated image where the machine learning model identifies potential damage.

20. The non-transitory, computer-readable storage media of claim 17, wherein the hazard data comprises at least one of hail data, wind data, flood data, storm surge data, lightning strike data, tornado data, hurricane data, earthquake data, or wildfire data.

* * * * *